United States Patent [19]
Enami

[11] Patent Number: 6,045,934
[45] Date of Patent: Apr. 4, 2000

[54] SOLID POLYMER ELECTROLYTE FUEL CELL

[75] Inventor: Yoshiaki Enami, Kawasaki, Japan

[73] Assignee: Fuji Electric Co., Ltd., Kawasaki-ku, Japan

[21] Appl. No.: 09/034,207

[22] Filed: Mar. 4, 1998

[30] Foreign Application Priority Data

Mar. 5, 1997 [JP] Japan ................................. 9-049954

[51] Int. Cl.$^7$ ................................................. H01M 8/04
[52] U.S. Cl. ............................ 429/30; 429/13; 429/17; 429/20; 429/26
[58] Field of Search .................................. 429/13, 17, 19, 429/20, 26, 30

[56] References Cited

U.S. PATENT DOCUMENTS

| | | | |
|---|---|---|---|
| 5,360,679 | 11/1994 | Buswell et al. | 429/19 |
| 5,441,821 | 8/1995 | Merritt et al. | 429/17 |
| 5,470,671 | 11/1995 | Fletcher et al. | |
| 5,786,104 | 7/1998 | Black et al. | 429/13 |

*Primary Examiner*—Maria Nuzzolillo
*Assistant Examiner*—Monique Wills
*Attorney, Agent, or Firm*—Venable; Robert J. Frank

[57] ABSTRACT

A lightweight and inexpensive solid polymer electrolyte fuel cell having a simple structure wherein a stack is efficiently cooled to be able to cope with a high output density. Fuel gas flows through a fuel gas flow path provided in the stack while flowing air as an oxidizing agent through air reactive gas flow path to generate electric power. An air cooling gas flow path is provided inside the stack. Water is added to air fed from an air feed blower with a water feed unit. Humidified air flows through the air cooling gas flow path, and then flows through the air reactive gas flow path. Discharged air is cooled in a condenser to condense water, and the resulting condensed water is recirculated to the water feed unit.

8 Claims, 6 Drawing Sheets

SOLID POLYMER ELECTROLYTE FUEL CELL

This application is based on Patent Application No. 049,954/1997 filed Mar. 5, 1997 in Japan, the content of which is incorporated hereinto by reference.

BACKGROUND OF THE INVENTION

1. Field of the Invention

The present invention relates to a solid polymer electrolyte fuel cell wherein a solid polymer membrane is used to obtain electric energy by an electrochemical reaction, and particularly to the structure of a flow path of air for use as an oxidizing agent gas.

2. Description of the related Art

Figure 5:
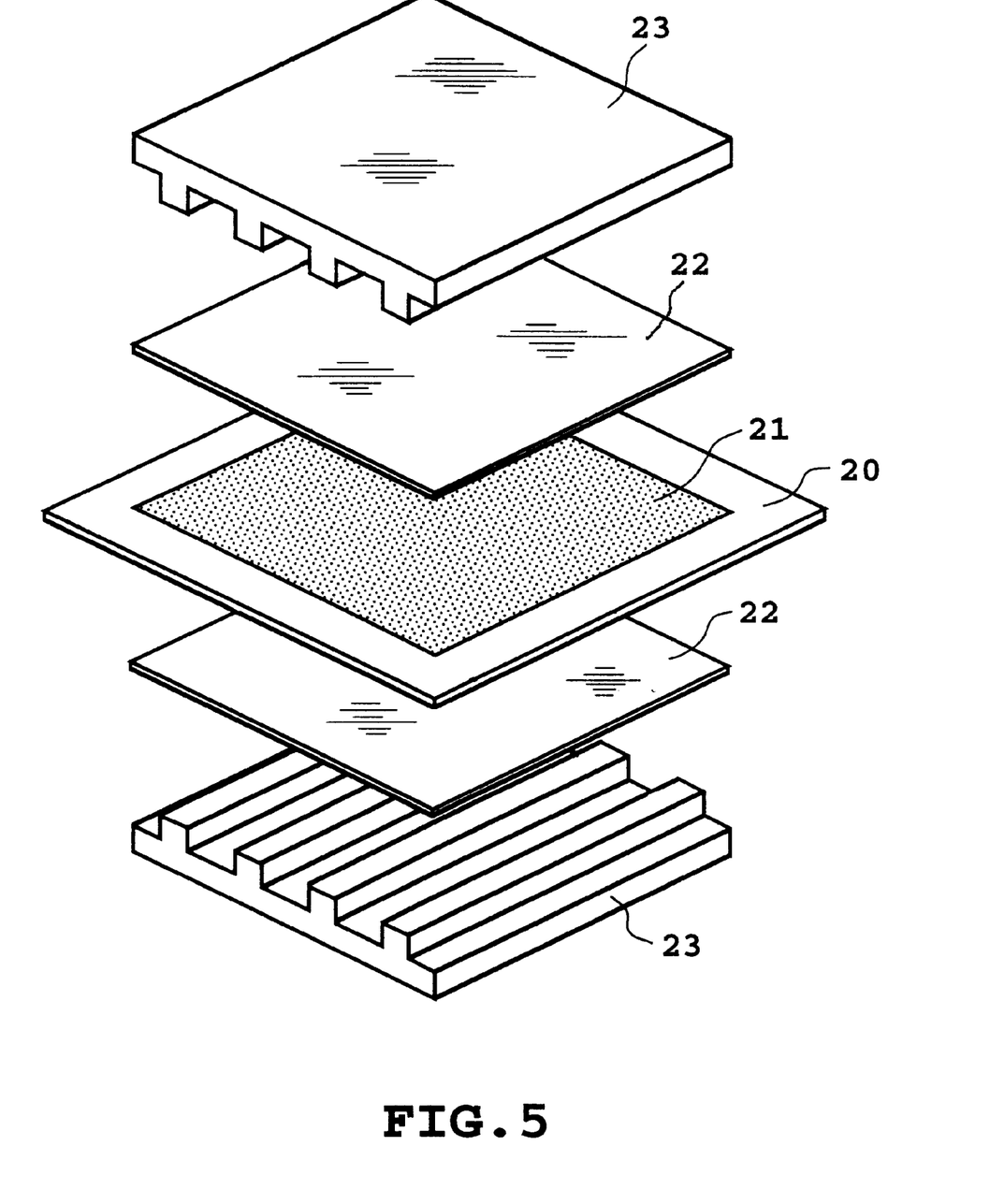
FIG. 5 is an exploded perspective view showing the basic structure of a cell of a solid polymer electrolyte fuel cell that is generally used.

FIG. 5 is an exploded perspective view showing the basic structure of a fuel cell as a minimum power generation unit of a solid polymer electrolyte fuel cell that is generally used. Catalyst layers 21 containing a precious metal, which is mainly platinum, are joined to the two surfaces of an electrolyte membrane 20 constituted of a solid polymer membrane to form a membrane-electrode assembly. Diffusion layers 22 are disposed on both other surfaces of the membrane-electrode assembly to play the roles of allowing either a fuel gas or an oxidizing agent gas to be passed to the catalyst layers 21 while performing a function of outward delivery of an electric current. They are interposed between gas-impermeable separators 23 to form a cell. In an example of the structure of FIG. 5, the surfaces of the separators 23 facing the respective diffusion layers 22 are formed in a ribbed structure wherein either a fuel gas or an oxidizing agent gas flows through grooves between ribs. A large number of fuel cells having the foregoing structure are laminated to form a fuel cell stack that is used as the battery body of a solid polymer electrolyte fuel cell.

The solid polymer membrane for use as the electrolyte membrane 20 is saturated with water to lower the resistivity of the membrane, whereby it can function as a proton-conductive electrolyte. In order to maintain the efficiency of power generation at a high level, therefore, the hydrous state of the membrane must be kept in a saturated state. In view of this, there is adopted a method wherein water is fed to a reactive gas to provide a high-humidity gas, which is then sent to a fuel cell to suppress evaporation of water from the membrane to thereby prevent the membrane from drying.

Figure 6:
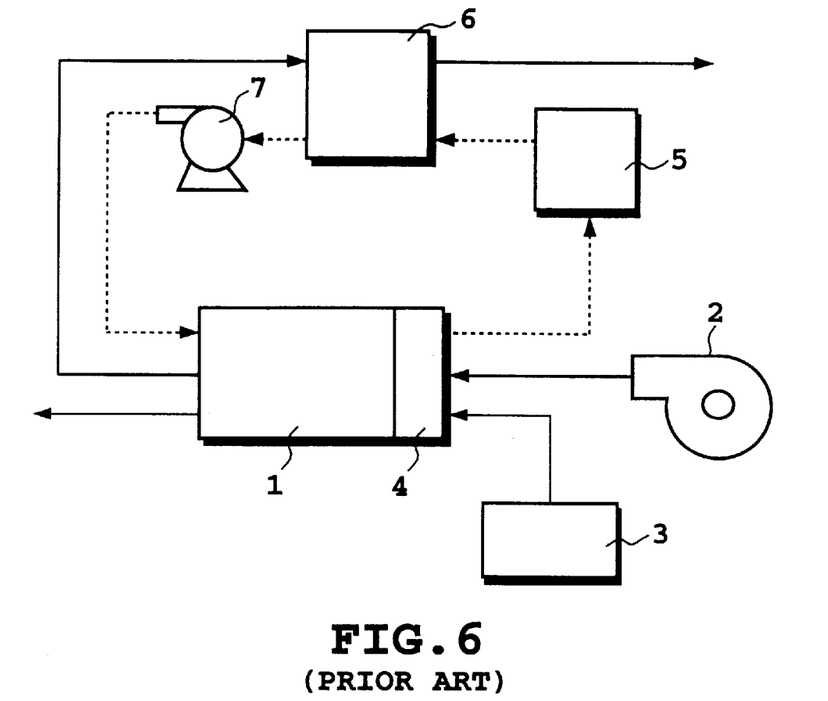
FIG. 6 is a basic system diagram showing conventional examples of a reactive gas system and a cooling water system in a solid polymer electrolyte fuel cell.

FIG. 6 is a basic system diagram showing examples of the reactive gas system and cooling water system of a conventional solid polymer electrolyte fuel cell. Air to be sent as an oxidizing agent gas to a fuel cell stack 1 is increased in pressure with an air feed blower 2 before being fed thereto. Air is admixed with moisture in a humidifier portion 4 attached to the stack 1, and then sent to the air electrode of every cell. In the humidifier portion 4, a method is used, for example, wherein air and cooling water respectively flow along the two surfaces of a thin water-permeable membrane to humidify air. Part of the oxygen in the air is reduced in the catalyst layers of a cell to form water. Air containing formed water and discharged from the stack 1 is sent to a condenser 6 to recover surplus water, and is then discharged out of the system. On the other hand, the fuel gas, which is supplied from a fuel feed source 3 such as a high-pressure hydrogen tank or a fuel reforming unit, is sent to the fuel electrode of every cell of the stack 1. The fuel gas may be passed or may not be passed through the humidifier portion 4 attached to the stack 1. In order to remove heat generated in the stack 1 by a battery reaction, there is provided a cooling water circulation system wherein a cooling unit 5 for cooling the cooling water by heat exchange and a pump 7 for sending the cooling water to the stack 1 are incorporated. Additionally stated, there is a case where a cooling water tank is provided though it is not included in the system of FIG. 6.

Figure 7:
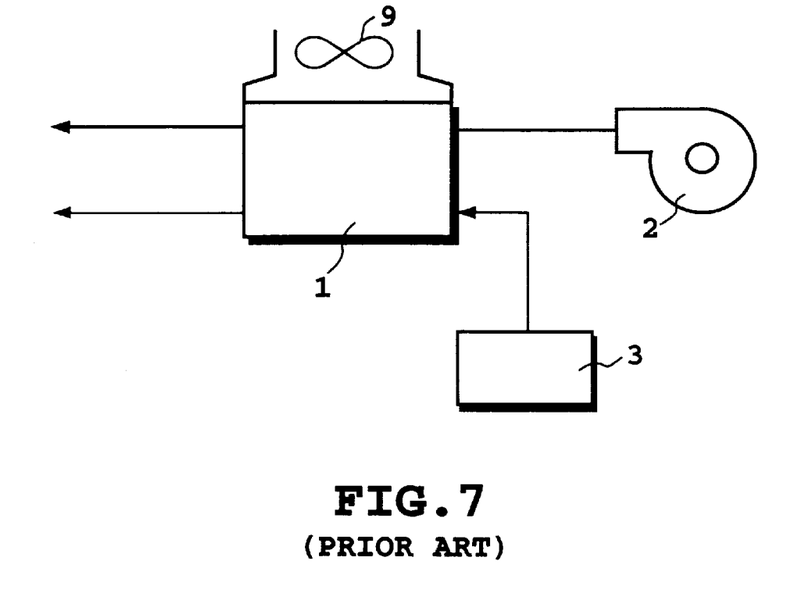
FIG. 7 is a basic system diagram of another conventional example of a reactive gas system in a solid polymer electrolyte fuel cell.

FIG. 7 is a basic system diagram of an example of another structure of the reactive gas system of a conventional solid polymer electrolyte fuel cell. In this structure, removal of heat generated in a fuel cell stack 1 is effected by air cooling with a cooling fan 9. Since this structure is not provided with a cooling water system, air increased in pressure and fed by an air feed blower 2 is discharged from the system without recovery of formed water.

As described above, in conventional solid polymer electrolyte fuel cells, there is adopted a method wherein heat generated in a stack 1 is removed by water cooling or air cooling to maintain a predetermined operating temperature.

In the method wherein cooling is effected with cooling water, however, there must be provided a cooling water system including a cooling unit 5 and a pump 7 incorporated thereinto. In the case where the cooling water system is used to conduct a long-term operation, the conductivity of cooling water must be maintained at or below a predetermined value to avoid a short-circuit between fuel cells. For this reason, a deionization unit (ion exchange resin), not shown in FIG. 6, must be incorporated into the system. This disadvantageously involves an increase in the number of units installed in addition to the fuel cell stack thereby increasing the weight and cost of the system.

On the other hand, the air-cooling method does not require a cooling water system as described above, but requires use of a large-capacity fan for introduction of a large amount of air because the cooling power of air is low as compared with water. Accordingly, there is a need for auxiliary machinery which is capable of enhancing the efficiency of power generation. Furthermore, since the cooling power provided by the air-cooling method is low, a difficulty is encountered in securing a high output density from the fuel stack making miniaturization of the stack difficult.

SUMMARY OF THE INVENTION

The present invention relates to a structure of a solid polymer electrolyte fuel cell, particularly to a structure of a flow path of air for use as an oxidizing agent gas. A primary object of the present invention is to provide a lightweight and inexpensive solid polymer electrolyte fuel cell wherein a stack is efficiently cooled even without use of a conventional cooling water system to be able to cope with a high output density.

There is provided a solid polymer electrolyte fuel cell comprising a fuel cell stack obtained by laminating a plurality of fuel cells each including a membrane-electrode assembly formed by joining a catalyst layer for fuel gas and a catalyst layer for air to the respective surfaces of a solid polymer electrolyte membrane, diffusion layers having the membrane-electrode assembly interposed therebetween, and gas-impermeable separators having the diffusion layers interposed therebetween; and provided with an air cooling gas flow path hermetically sealed from the fuel cell store including the catalyst layer for air and an air reactive gas flow path feeding along the catalyst layer for air.

Here, the solid polymer electrolyte fuel cell may be provided with a circuit wherein air preliminarily admixed with water is flows through the air cooling gas flow path, and then flows through the air reactive gas flow path.

Condensed water obtained by condensing air flowing through the air reactive gas flow path may be added to air to be sent through the air cooling gas flow path for recirculation thereof.

Condensed water obtained by condensing air flowing through the cooling gas flow path for air may be added to air to be sent through the air cooling gas flow path for recirculation thereof.

Condensed water obtained by condensing air flowing through the reactive gas flow path may be added to air to be sent through the air cooling gas flow path for recirculation thereof.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

In to the solid polymer electrolyte fuel cell of the present invention, air is flows through an air cooling gas flow path provided in a fuel cell stack to cool the stack, and then flows through an air reactive gas flow path to bring about an electrochemical reaction. Thus, the stack can be further miniaturized with high cooling efficiency since the air cooling gas flow path is disposed in the fuel cell stack, which is cooled by air cooling. Particularly since air preliminarily admixed with water is fed and circulated, liquid or atomized water contained in the air receives heat from the stack during the passage of air through the air cooling gas flow path to be partly or wholly evaporated, whereby the stack is effectively cooled due to the latent heat of evaporation of water while at the same time humidifying air to be sent through the air reactive gas flow path.

When the fuel cell of the present invention is further provided with a circuit wherein condensed water obtained by condensing air flowing through the air reactive gas flow path is added to air to be sent through the air cooling gas flow path for recirculation thereof, or provided with a circuit wherein condensed water obtained by condensing air flowing through the cooling gas flow path for air and containing saturated water vapor is added to air flowing through the air cooling gas flow path for recirculation thereof, or is further provided with a circuit wherein condensed water obtained by condensing air flowing through the air reactive gas flow path is added to air to be sent through the air cooling gas flow path for recirculation thereof, water can be efficiently utilized to make miniaturization of a water feed unit feasible.

EXAMPLE 1

Figure 1:
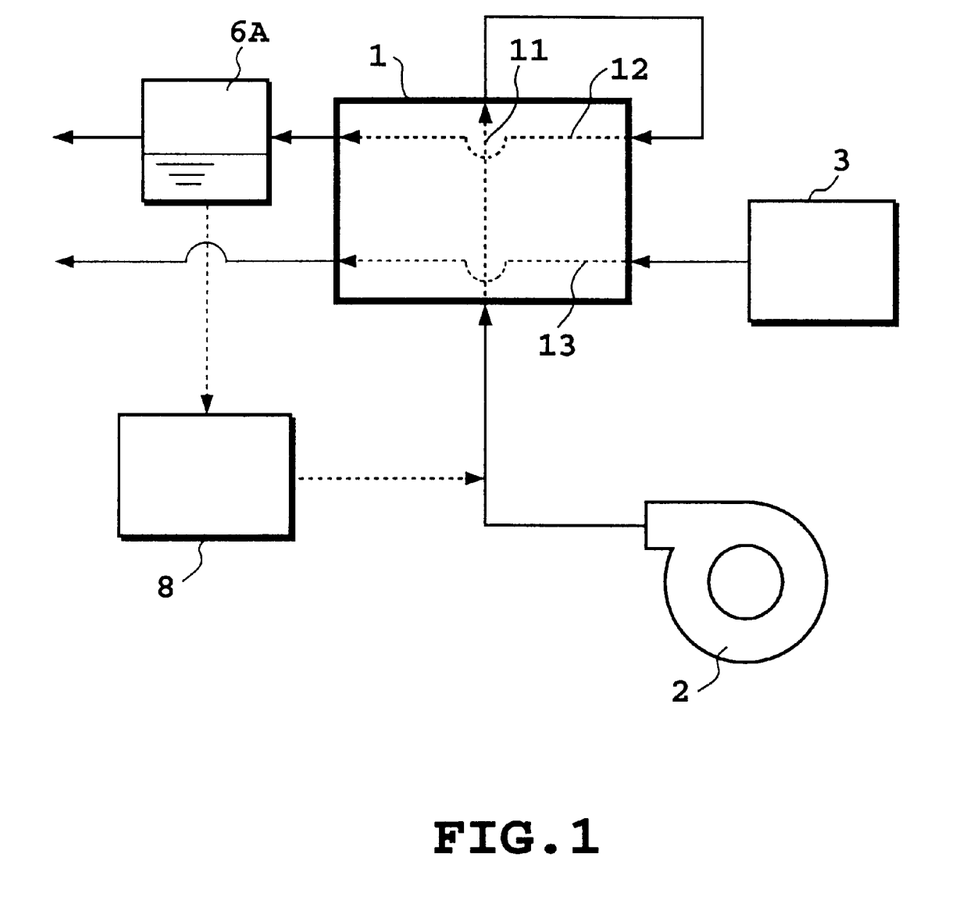
FIG. 1 is a basic system diagram showing the structure of a reactive gas system in Example 1 of the solid polymer electrolyte fuel cell of the present invention.

As can be seen in FIG. 1, the structure of this Example is constructed in such a way that air fed from an air feed blower 2 and given water by a water feed unit 8 first flows through an air cooling gas flow path 11 formed inside a fuel cell stack 1 to be used for cooling the stack 1, and flows through an air reactive gas flow path 12 inside the stack 1 to be used for a power generation reaction. Further, air discharged from the stack 1 after contribution to the power generation reaction is cooled in a condenser 6A to be stripped of water, and is then discharged from the system. Condensed water obtained in the condenser 6A is recirculated and sent to the water feed unit 8 to be reused as the water combined with the air supplied by air feed blower 2. Fuel gas, supplied by a fuel gas feed unit 3, flows through a fuel gas flow path 13 within fuel cell stack 1.

Figure 2:
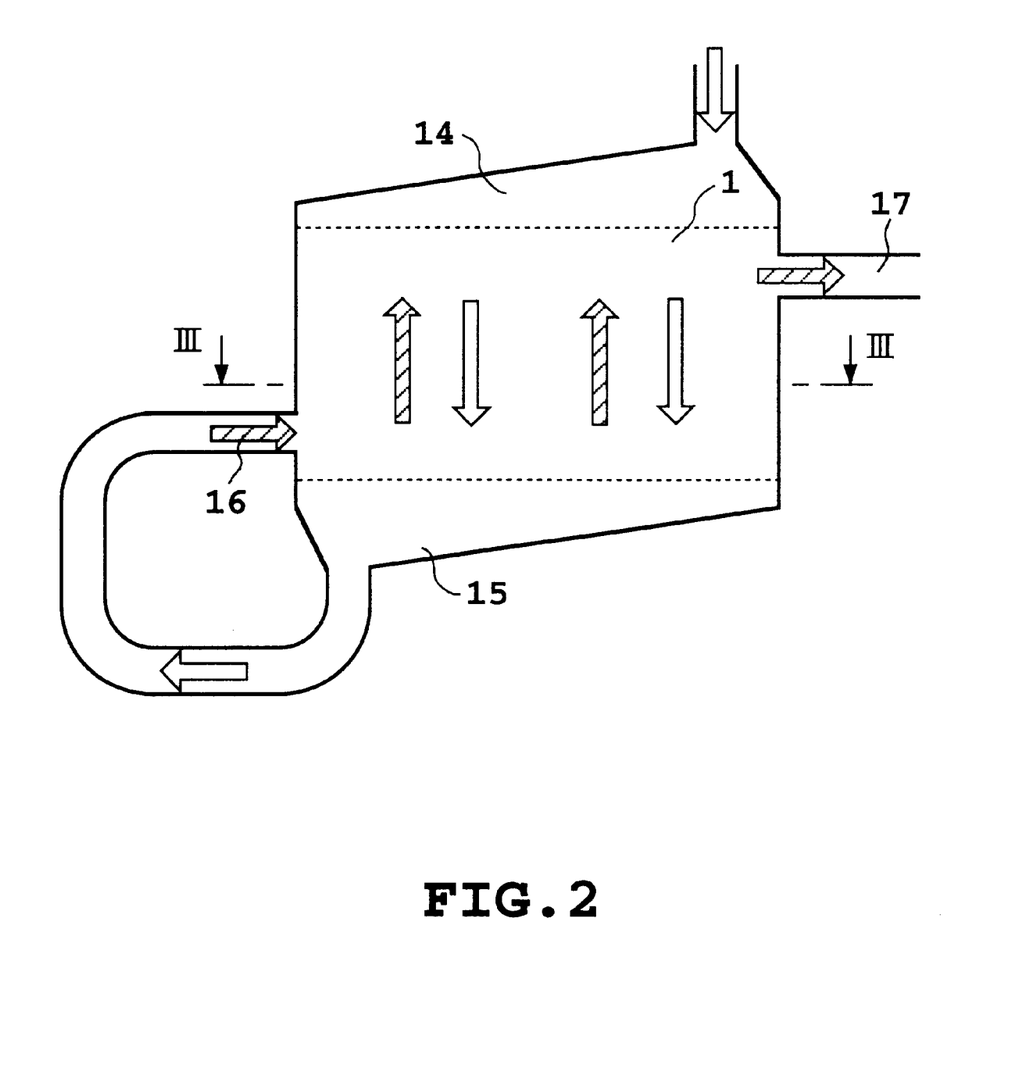
FIG. 2 is a schematic diagram showing air flow in a fuel cell.
Figure 3:
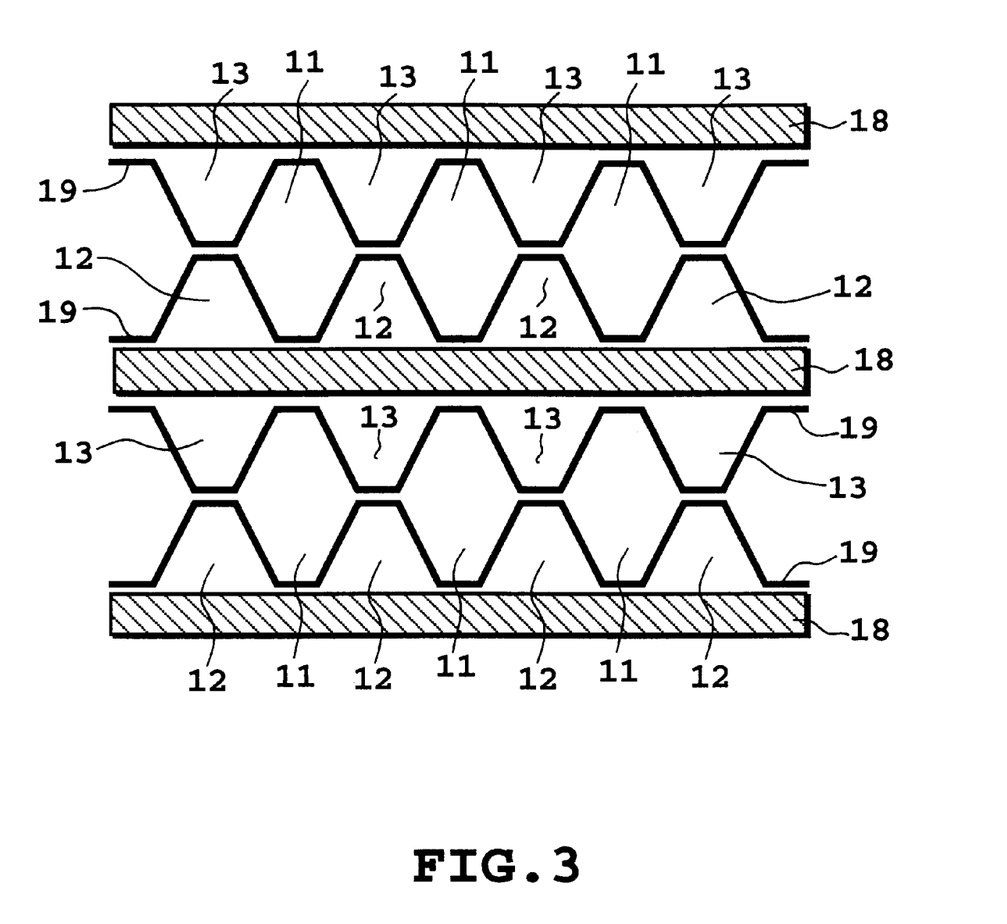
FIG. 3 is an enlarged cross-sectional view of a cell portion, taken along the plane III—III of FIG. 2.

The fuel cell stack 1 in use is a stack of having a 1 kW DC output wherein 12 cells having an electrode area of 300 cm$^2$ are stacked in a laminated form, and which is operated under ordinary pressure at a current density of 0.4 A/cm$^2$ at a cell voltage of 0.7 V. As shown in FIG. 2, air containing liquid or atomized water is introduced via a cooled air inlet manifold 14, then flows through the inside of the stack 1 to reach a cooled air outlet manifold 15, then sent again to the inside of the stack 1 via a reactive air inlet 16 to contribute as reactive air to a power generation reaction, and then discharged via a reactive air outlet 17. As shown in the enlarged cross-sectional view of FIG. 3, the stack 1 is constructed in such a way that two wavy separators 19 made of a gas-impermeable material are disposed on the two surfaces of every membrane-electrode assembly 18 formed by respectively joining catalyst layers to the two surfaces of a solid polymer electrolyte membrane. This forms a fuel gas flow path 13 on the catalyst layer's side of a fuel electrode of the membrane-electrode assembly 18 and an air reactive gas flow path 12 on the catalyst layer's side of an air electrode, while further forming an air cooling gas flow path 11 between the two separators 19 at some distance from membrane-electrode assembly 18.

The flow rate of reactive air necessary for securing a rated DC output of 1 kW is 6.3×10$^{-2}$ m$^3$/min when this stack 1 is operated at an air utilization of 40%. When a temperature difference between cooling air and the cells is set to be 30 K, the amount of heat consumed for an increase of 30 K in the temperature of air at this flow rate is calculated to be about 40 W, i.e., 11 mW/cm$^2$ per unit area of electrode. The amount of heat of evaporation of water formed through an electrochemical reaction is calculated to be about 90 mW/cm$^2$ per unit area of electrode. Even if both are summed, the amount of heat necessary for them is 0.1 W/cm$^2$, which is insufficient for consumption of heat generated in an amount of 0.31 W/cm$^2$ in the stack 1. On the other hand, when the hydraulic diameter of the air cooling gas flow path 11 is, for example, 1 mm in this structure, the temperature difference between cooled air and the cells is 30 K, the Nusselt number is 3.6 and the heat conductivity of air is 27.5×10$^{-3}$ W/mK, the cooling power per unit area is evaluated to be about 0.3 W/cm$^2$. Since the amount of generated heat is 0.31 W/cm$^2$ as mentioned above, the cooling power becomes substantially equal to the amount of generated heat. Since the calculated cooling power corresponds to the marginal cooling power in a state of laminar flow with excellent heat transfer properties, however, the actually secured cooling power is restricted to a lower value. In other words, a difficulty is encountered in maintaining the stack at a predetermined temperature by removing 0.31 W/cm$^2$ of heat generated in the stack 1 only with cooling air flowing through the air cooling gas flow path 11.

By contrast, according to the structure of this Example, since air combined with water by the water feed unit 8 is introduced into the air cooling gas flow path 11 to be cooled thereby, the heat of evaporation of liquid or atomized water contained in air effectively acts for removal of heat generated in an amount of 0.31 W/cm$^2$ in the stack 1. More specifically, when water that is about 2.3 times as much as water to be formed is preliminarily added and supplied to air from the water feed unit 8, that amount of heat generated in the stack 1 is absorbed by the heat of evaporation of formed water and water added to air as well as an increase in the temperature of reactive air at a predetermined flow rate, whereby the stack can be maintained at a predetermined temperature. Additionally stated, in this case, the partial pressure of water vapor at the reactive air inlet 16 becomes 27.3 kPa, and the partial pressure of water vapor at the reactive air outlet 17 becomes 37.0 kPa.

This structure is capable of efficiently cooling the stack even without using a large-sized system such as a conventional cooling water system. This enables a lightweight and inexpensive solid polymer electrolyte fuel cell to be obtained. A further increase in the amount of water to be added to air from the water feed unit 8 can improve the cooling power thereby coping with a fuel cell having a high output density.

EXAMPLE 2

Figure 4:
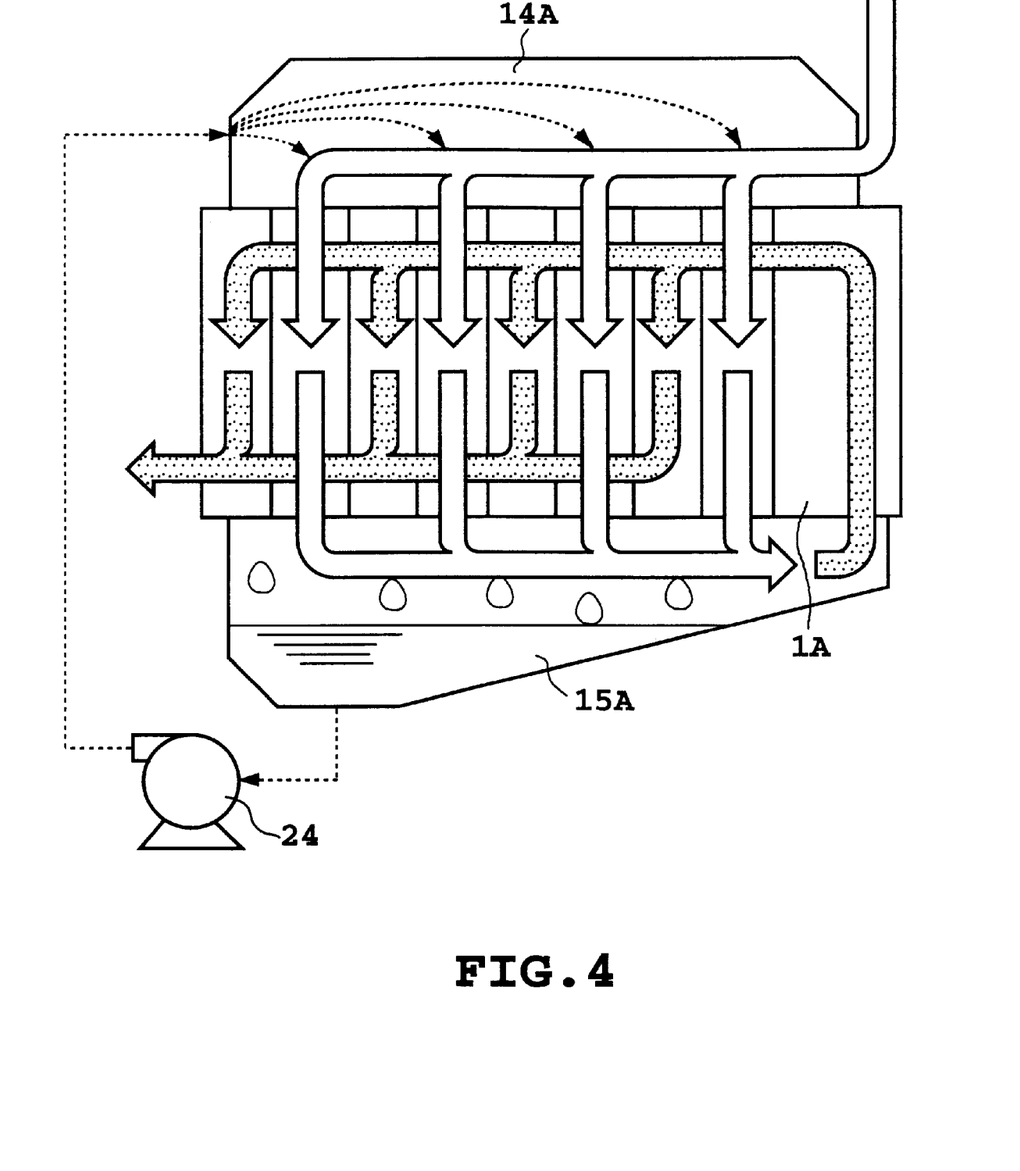
FIG. 4 is a schematic diagram showing air flow in the fuel cell stack described in Example 2 of the solid polymer electrolyte fuel cell of the present invention.

FIG. 4 is a schematic diagram showing air flow in the fuel cell stack of another embodiment of the solid polymer electrolyte fuel cell of the present invention.

The structure of a reactive gas system of this Example is basically the same as the reactive gas system of Example 1 as shown in FIG. 1 excepting the stack portion. Air fed by an air feed blower is admixed with water using a water feed unit, and sent through an air cooling gas flow path disposed inside the stack to cool the stack. Thereafter, the resulting air flows through a reactive gas flow path disposed inside the stack to be used for a power generation reaction. Water contained in the air discharged from the stack after contribution to the power generation reaction is condensed in a condenser, and sent to a water feed unit to be reused as the water combined with air supplied by the air feedblower.

A difference between this Example and Example 1 lies in the structure of the air flow path in the stack. In this Example, cooled air containing liquid or atomized water and sent to a cooling air inlet manifold 14A for the fuel cell stack 1A flows through an air cooling gas flow path to absorb heat generated by an electrochemical reaction to thereby cool the stack 1A, while air is heated and elevated in temperature. In this step, part of the water is evaporated to humidify air, while the rest of the water is condensed in a cooling air outlet manifold 15A to be stored in a liquid form. Humidified air is guided to an air reactive gas flow path via a feed inlet provided in the cooling air outlet manifold 15A. After contribution to the electrochemical reaction in the stack, air is discharged as air exhaust gas from the stack 1A and sent to a condenser disposed in the rear of the stack. On the other hand, condensed water stored in the cooling air inlet manifold 15A is sent by means of a pump 24 to the cooling air inlet manifold 14A, from which the condensed water flows again together with introduced cooling air through the air cooling gas flow path to be reused for cooling of the stack 1A and humidification of the reactive air.

In this structure, the temperature of the stack 1A is adjusted by the flow rate of the introduced cooling air. The degree of humidification of the reactive gas is automatically adjusted by the saturated vapor pressure inside the cooling air outlet manifold 15A, i.e., the temperature of the stack 1A.

According to the present invention, since the solid polymer electrolyte fuel cell thereof is constituted in the foregoing manner, the stack can be cooled according to a compact system high in cooling efficiency wherein the latent heat of evaporation of water is efficiently utilized. Accordingly, there can be obtained a lightweight and inexpensive solid polymer electrolyte fuel cell capable of coping with a high output density. Further, since water is so efficiently utilized that a water feed unit can be miniaturized, the solid polymer electrolyte fuel cell can favorably be lightweight, inexpensive and capable of coping with a high output density.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A solid polymer electrolyte fuel cell comprising:
   a fuel cell stack obtained by laminating a plurality of fuel cells each including a membrane-electrode assembly formed by joining a catalyst layer for fuel gas and a catalyst layer for air to respective surfaces of a solid polymer electrolyte membrane;
   diffusion layers having said membrane-electrode assembly interposed therebetween;
   gas-impermeable separators having said diffusion layers interposed therebetween, said gas impermeable separators being provided with an air cooling gas flow path hermetically sealed from the fuel cell stack and an air reactive gas flow path feeding along said catalyst layer for air; and
   a circuit wherein air preliminarily admixed with water flows through said air cooling gas flow path, and then flows through said air reactive gas flow path.

2. A solid polymer electrolyte fuel cell as claimed in claim 1 further comprising a circuit wherein condensed water obtained by condensing air flowing through said air reactive gas flow path is added to air flowing through said air cooling gas flow path for recirculation thereof.

3. A solid polymer electrolyte fuel cell as claimed in claim 1 further comprising a circuit wherein condensed water obtained by condensing air flowing through said air cooling gas flow path is added to air flowing through said air cooling gas flow path for recirculation thereof.

4. A solid polymer electrolyte fuel cell as claimed in claim 3 further comprising a circuit wherein condensed water obtained by condensing air flowing through said air reactive gas flow path is added to air flowing through said air cooling gas flow path for recirculation thereof.

5. A solid polymer electrolyte fuel cell, comprising:
   at least first and second spaced membrane-electrode assemblies, each of said assemblies including
      an electrolyte membrane having first and second opposing surfaces; and first and second catalyst layers affixed to the first and second surfaces of said membrane respectively; and first and second gas-impermeable separators interposed between said first and second assemblies, said first separator channeling fuel gas into a fuel gas path for flow along said first catalyst layer and said second separator channeling air reactive gas into an air reactive gas flow path for flow along said second catalyst layer, air cooling gas flowing in an air cooling gas flow path between said first and second separators and hermetically sealed from said first and second catalyst layers, air flowing through said air cooling gas path and then through said air reactive gas flow path.

6. A solid polymer electrolyte fuel cell as claimed in claim 5 further comprising a circuit wherein condensed water obtained by condensing air flowing through said air reactive gas flow path is added to air flowing through said air cooling gas flow path for recirculation thereof.

7. A solid polymer electrolyte fuel cell as claimed in claim 5 further comprising a circuit wherein condensed water obtained by condensing air flowing through said air cooling gas flow path is added to air flowing through said air cooling gas flow path for recirculation thereof.

8. A solid polymer electrolyte fuel cell as claimed in claim 7 further comprising a circuit wherein condensed water obtained by condensing air flowing through said air reactive gas flow path is added to air flowing through said air cooling gas flow path for recirculation thereof.

* * * * *